Jan. 3, 1967 R. M. STONE 3,296,441
INFRARED TEMPERATURE AND FREQUENCY COMPENSATION CIRCUIT
Filed Aug. 30, 1963 2 Sheets-Sheet 1

RICHARD M. STONE
INVENTOR.

BY J. M. St. Amand
ATTORNEY

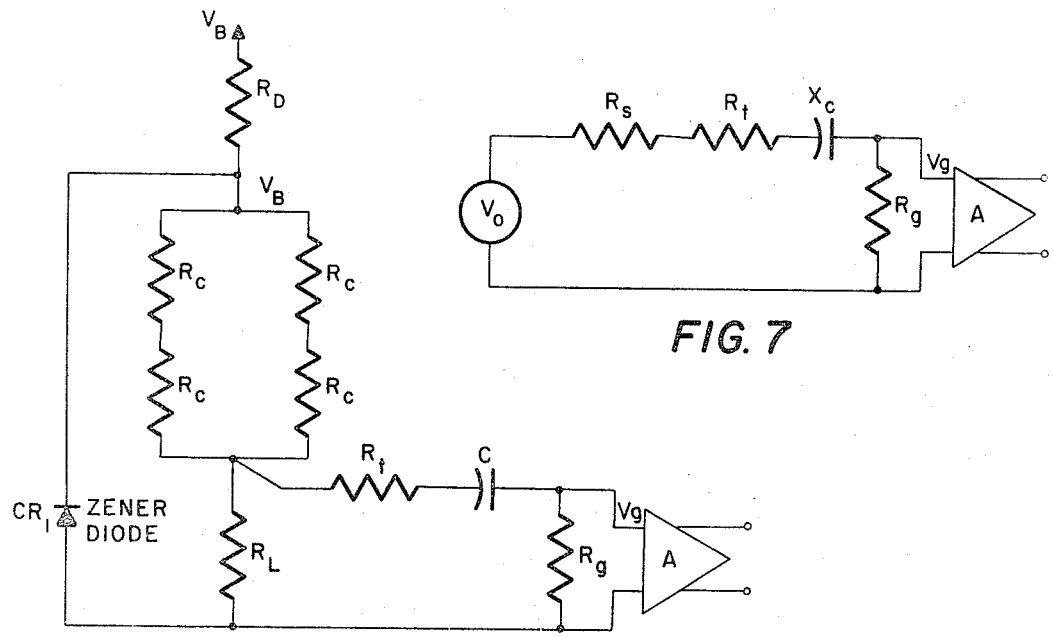
FIG. 7
FIG. 6
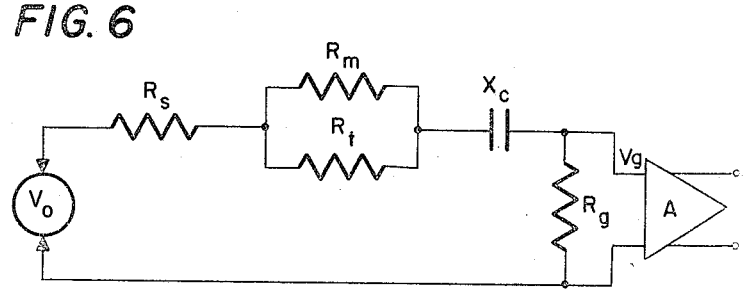
FIG. 8
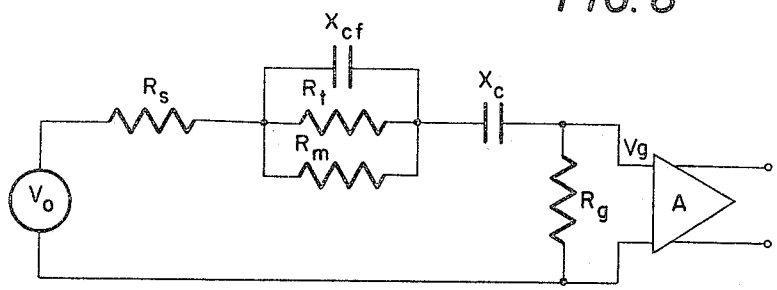
FIG. 9
RICHARD M. STONE
INVENTOR.

United States Patent Office 3,296,441
Patented Jan. 3, 1967

3,296,441
INFRARED TEMPERATURE AND FREQUENCY COMPENSATION CIRCUIT
Richard M. Stone, Rochester, N.Y., assignor, by mesne assignments, to the United States of America as represented by the Secretary of the Navy
Filed Aug. 30, 1963, Ser. No. 305,900
7 Claims. (Cl. 250—83.3)

The present invention relates to electrical networks, and more particularly to a temperature compensating network for improving the temperature compensation in an infrared detecting system.

It is an object of the invention to provide an improved temperature compensating network.

Another object of the invention is to provide improved temperature compensation for infrared detecting apparatus.

Other objects and many of the attendant advantages of this invention will become readily appreciated as the same becomes better understood by reference to the following detailed description when considered in connected with the accompanying drawings wherein:

FIG. 6 is a preliminary circuit for a temperature compensating network;

FIG. 7 represents the A.C. equivalent of the circuit of FIG. 6;

FIG. 8 shows the circuit of FIG. 7 with a limiting resistor;

FIG. 9 shows the circuit of FIG. 8 with frequency compensation.

The present invention for a temperature compensating cell network provides an optimum method for improving compensation for temperature change in an infrared detecting system. This invention uses a resistor and capacitor in parallel with an infrared detecting cell in a network to compensate for various effects caused by changes in temperature.

The present invention for a temperature compensating cell network which provides an optimum method for improving the temperature compensation (or compensation for temperature change) in an infrared detecting system is based on data obtained from the measurements made of cell temperature characteristics. The temperature compensating network is first described from the point of view of its theoretical development and, second, as a procedure whereby it was actually designed for infrared detecting apparatus. Infrared detecting cells which have a cell dark resistance that changes when illuminated with infrared energy are very well known and commonly called infrared sensitive photoconductors; typical of such are lead sulfide, lead selenide and lead telluride infrared sensitive cells.

*Theory*

Figure 1:
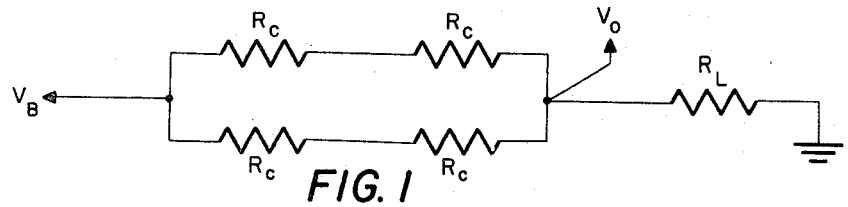
FIG. 1 is a circuit diagram of a four-cell series-parallel network used in an infrared detecting device.
Figure 2:
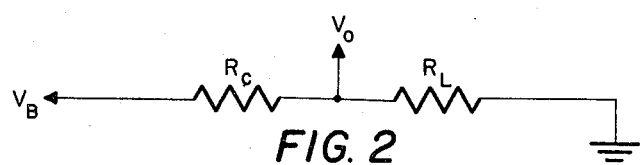
FIG. 2 is an assumed single cell representation of the circuit of FIG. 1.
Figure 3:
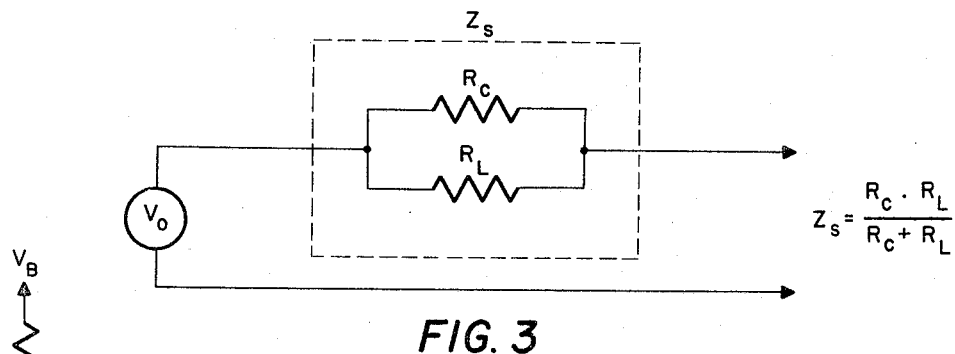
FIG. 3 is the A.C. equivalent circuit representation of FIG. 2.

A four-cell series-parallel network, as shown in FIG. 1, used in an infrared detecting device was assumed to be a single cell with the same resistance but with only one-fourth the sensitivity as represented in FIG. 2. The A.C. equivalent circuit for the single cell network of FIG. 2 is shown in FIG. 3.

In such a single-cell system, as in FIG. 3, the cell sensitivity may be expressed as a function of the change in cell resistance as follows:

$$V_o = V_B \frac{R_L}{R_c + R_L} - \frac{R_L}{R_c - \Delta R_c + R_L} \quad (1)$$

where:
$V_o$=Signal output (volts R.M.S.)
$V_B$=Bias (volts D.C.)
$R_L$=Load resistor (ohms)
$R_c$=Cell dark resistance (ohms)
$-\Delta R_c$=Change in cell resistance when illuminated with infrared energy of H watts/cm.$^2$ (R.M.S.)

Rearranging Equation 1 gives:

$$\Delta R_c/R_c = \frac{V_o}{V_B} \cdot \frac{R_c^2 + 2R_cR_L + R_L^2 - \Delta R_c(R_c + R_L)}{R_cR_L}$$

If $\Delta R_c \ll R_c$ and $R_L$ then:

$$\Delta R_c/R_c = \frac{V_o}{V_B} \cdot \frac{(R_c + R_L)^2}{R_cR_L} \quad (2)$$

The specific responsivity of a detector cell is defined as:

$$S_1 = \frac{V_o}{HV_B} \cdot \frac{(R_c + R_L)^2}{4R_cR_L} \quad (3)$$

where:
$S_1$=Specific responsivity (cm.$^2$/watt)
$V_o$=Signal output (volts—R.M.S.)
$V_B$=Bias (volts D.C.)
$H$=infrared irradiance (watts/cm.$^2$—R.M.S.)
$R_c$=Cell dark resistance (ohms)
$R_L$=Load resistor (ohms)

Combining Equations 2 and 3 gives:

$$-\Delta R_c/R_c = 4S_1H \quad (4)$$

Figure 4:
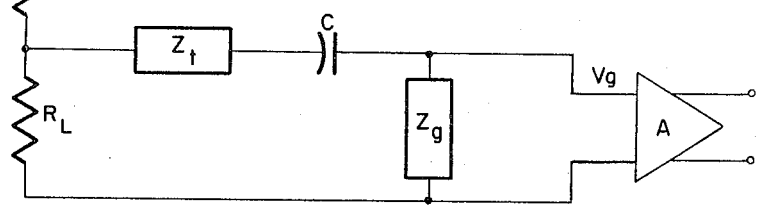
FIG. 4 is a circuit diagram representing a single cell network with a typical external load.
Figure 5:
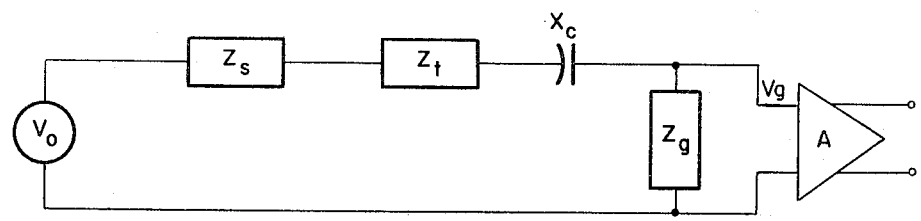
FIG. 5 represents the A.C. equivalent of the circuit of FIG. 4.

Therefore, the responsivity (sensitivity) of a given cell network may be defined by Equation 3 and this equation may be rearranged as follows:

$$V_o = 4S_1HV_B \cdot \frac{R_cR_L}{(R_c + R_L)^2} \quad (5)$$

for calculating the signal output voltage when the other factors in the equation are known. Equation 5 holds true only if there is no external load on the output of the cell network. If an external load is connected on the output of the cell network as shown in FIGS. 4 and 5, the signal voltage $V_g$ at the grid of the first tube of the signal amplifier A may be expressed as follows:

$$V_g = V_o \cdot \frac{Z_g}{Z_g + Z_s + Z_c + Z_t}$$

where:
$V_g$=Signal at grid (volts—R.M.S.)
$V_o$=Define by Equation 5
$Z_g$=Grid input impedance (ohms)
$Z_s$=Cell network source impedance (ohms)
$Z_c$=Coupling network impedance (ohms)
$Z_t$=Temperature compensating impedance (ohms)

Combining Equations 5 and 6 gives:

$$V_g = 4S_1HV_B \cdot \frac{R_cR_L}{(R_c + R_L)^2} \cdot \frac{Z_g}{Z_g + Z_c + Z_t + Z_s} \quad (7)$$

The factors in this equation are as previously defined.

Equation 7 is the general equation which may be used to determine the signal output voltage from a single-cell network with an external load as in FIGS. 4 and 5. To apply this equation in this temperature compensation study for an infrared detecting device, several changes must be made. As previously described, the circuit of FIG. 1 is a four-cell, series-parallel network which has the same resistance but only one-fourth the sensitivity of a single cell network; therefore, Equation 7 must be divided by a factor of four.

The values of $S_1$ were measured at a frequency low enough to eliminate any sensitivity attenuation caused by a long time constant in a detector cell. If the temperature compensation network must also provide frequency compensation, then Equation 7 must contain a cell time constant factor. The detector cells were assumed to have a logarithmic sensitivity versus time response. If this is true, then the sensitivity term $S_1$ may be divided by $\sqrt{1+(2\pi fT)^2}$, where T is defined as the time constant of the cell.

Applying the two factors mentioned above, Equation 7 now becomes:

$$V_g = \frac{S_1 H V_B}{\sqrt{1+(2\pi fT)^2}} \cdot \frac{R_c R_L}{(R_c+R_L)^2} \cdot \frac{Z_g}{Z_g+X_c+Z_t+Z_s} \quad (8)$$

Equation 8 now contains all factors necessary for determining the sensitivity of a cell network at any temperature and frequency provided the cell characteristics are known.

*Procedure*

The following procedure was used in developing a temperature compensating network for an infrared Detecting Device. A preliminary circuit for the temperature compensating network was made as shown in FIG. 6, FIG. 7 being its A.C. equivalent circuit, and various values were assumed for all components.

The resistor $R_D$ and Zener diode $CR_1$ are used for decoupling and to hold $V_B$ constant over the required temperature range. The exact values of these components depend on the bias voltage which can be allowed and the maximum and minimum resistance $R_s$ of the cell network.

To simplify the initial calculations, the following assumptions were made:

(a) The frequency of the A.C. energy input was low enough to eliminate the time constant term from the equation.
(b) The impedance of the coupling capacitor was zero.
(c) The energy input was $10\mu$ watts/cm.$^2$.
(d) The bias voltage $V_B$ was 100 volts D.C.

Applying the above assumption to Equation 8, it becomes:

$$V_g = S_1 \times 10^{-3} \cdot \frac{R_c \cdot R_L}{(R_c+R_L)^2} \cdot \frac{R_g}{R_g+R_t+R_s} \quad (9)$$

where $R_s$=cell network source resistance.

Equation 9 was then used to calculate the grid signal voltage $V_g$ over the required temperature range for several combinations of component values.

These initial calculations indicated that the optimum value for $R_g$ and $R_L$ is one megohm. A higher value of either $R_g$ or $R_L$ reduces the effectiveness of the temperature compensating circuit. A lower value helps the temperature compensation, but reduce $V_g$. Also a lower value of $R_L$ allows excessive cell current at high temperatures.

A cell with the same resistance as each of the four detector cells in the network was chosen as the temperature compensating resistor $R_t$. The initial calculations show that this $R_t$ will over-compensate at low temperatures; therefore, a limiting resistor $R_m$ was put in parallel with $R_t$ as shown in FIG. 8. $R_m$ will limit the maximum value of the parallel combination of $R_m$ and $R_t$ and prevent over-compensation of the circuit at the low temperatures. For example, the value of $R_m$ should be about 20 megohms. A large coupling capacitor (.04 $\mu$f. for example) is desirable to eliminate as much low frequency signal attenuation as possible.

The circuit chosen with the example component values discussed above and with the addition of the limiting resistor $R_m$ provides excellent compensation. However, this circuit does not provide compensation for signal attenuation caused by increase in signal frequency.

To provide the desired frequency compensation, a circuit component with an impedance which is a function of frequency must be added. This component must also be temperature conscious because frequency compensation is only required at the lower temperatures where the detector cell time constants are relatively long.

These requirements can be met by putting a capacitor $C_f$ in parallel with $R_t$ and $R_m$ as shown in FIG. 9.

The effective impedance of these three components in parallel is a function of frequency because of $C_f$, and a function of temperature because of $R_t$.

To evaluate the effectiveness of the compensating circuit as a function of both temperature and frequency, Equation 8 must be used.

$$V_g = \frac{S_1 \cdot H \cdot V_B}{1+(2\pi fT)^2} \cdot \frac{R_c \cdot R_L}{(R_c+R_L)^2} \cdot \frac{Z_g}{Z_g+X_c+Z_t+Z_s}$$

Obviously many modifications and variations of the present invention are possible in the light of the above teachings. It is therefore to be understood that within the scope of the appended claims the invention may be practiced otherwise than as specifically described.

What is claimed is:

1. A circuit for temperature compensation of an infrared detecting cell network comprising:
   (a) an infrared detecting cell network consisting of at least one infrared detecting cell having a given total cell dark resistance, and a load resistor having one end connected in series therewith at a junction,
   (b) a temperature compensating resistance means having one end connected at said junction and its other end connected to one side of a coupling capacitor which in turn has its other side connected with one end of a signal voltage resistance, the other end of said signal voltage resistance connected to the other end of said load resistor,
   (c) a signal voltage amplifier means connected across said signal voltage resistance,
   (d) a Zener diode connected in parallel across said series combination of the infrared detecting cell network and load resistance,
   (e) a source of bias voltage,
   (f) a decoupling resistor connected between said bias voltage source and the opposite end of said cell network from said junction,
   (g) said decoupling resistor and said Zener diode being used for decoupling and holding the bias voltage constant over a required temperature range.

2. A circuit as in claim 1 wherein a limiting resistor is connected in parallel with said temperature compensating resistance means for limiting the maximum value of the parallel combination and prevent over-compensation of the circuit by said temperature compensating resistance means at low temperatures.

3. A circuit as in claim 2 wherein a capacitor is also connected in parallel across said limiting resistor and temperature compensating resistance means parallel combination to compensate for signal attenuation caused by increase in signal frequency only at low temperatures where the time constants of said at least one infrared detecting cell is relatively long.

4. A circuit as in claim 1 wherein said temperature compensating resistance consists of an infrared detecting cell having the same resistance as each of the at least one detecting cells in said infrared detecting cell network.

5. A circuit for temperature compensation of an infrared detecting cell network comprising:
   (a) an infrared detecting cell network consisting of two series strings of two infrared detecting cells connected in parallel having a given total cell dark resistance, and a load resistor having one end connected in series therewith at a junction,
(b) a temperature compensating resistance means having one end connected at said junction and its other end connected to one side of a coupling capacitor which in turn has its other side connected with one end of a signal voltage resistance, the other end of said signal voltage resistance connected to the other end of said load resistor,
(c) said temperature compensating resisting means consisting of an infrared detecting cell having the same resistance as each of the cells in said infrared detecting cell network,
(d) a signal voltage amplifier means connected across said series combination of the signal voltage resistance,
(e) a Zener diode connected in parallel across said infrared detecting cell network and load resistance,
(f) a source of bias voltage,
(g) a decoupling resistor connected between said bias voltage source and the opposite end of said cell network from said junction,
(h) said decoupling resistor and said Zener diode being used for decoupling and holding the bias voltage constant over a required temperature range.

6. A circuit as in claim 5 wherein a limiting resistor is connected in parallel with said temperature compensating resistance means for limiting the maximum value of the parallel combination and prevent over-compensation of the circuit by said temperature compensating resistance means at low temperatures.

7. A circuit as in claim 6 wherein a capacitor is also connected in parallel across said limiting resistor and compensating resistance means parallel combination to compensate for signal attenuation caused by increase in signal frequency only at low temperatures where the time constants of said detecting cells are relatively long.

References Cited by the Examiner
UNITED STATES PATENTS

| | | | |
|---|---|---|---|
| 2,452,551 | 11/1948 | Conant | 324—105 |
| 3,161,771 | 12/1964 | Enborg et al. | 73—355 X |
| 3,170,329 | 2/1965 | Prediger et al. | 73—355 |
| 3,199,087 | 8/1965 | Foglia | 323—68 X |

RALPH G. NILSON, *Primary Examiner.*

S. ELBAUM, *Assistant Examiner.*